United States Patent Office 3,450,746
Patented June 17, 1969

3,450,746
TETRAPHENOLIC ESTERS
Christian Stapfer, Newtown, Pa., assignor to Hercules Incorporated, a corporation of Delaware
No Drawing. Filed Jan. 3, 1966, Ser. No. 517,991
Int. Cl. C07c 69/76
U.S. Cl. 260—473         7 Claims

ABSTRACT OF THE DISCLOSURE

Tetraphenolic-substituted acid esters such as 2,2,4,4-tetramethyl-1,3-cyclobutyl-di[bis(3,5-di-tert-butyl-4-hydroxyphenyl)]-acetate;
1,4-phenyl-di[bis(3,5-di-tert-butyl-4-hydroxyphenyl)]-acetate;
2,2,4,4-tetramethyl-1,3-cyclobutyl-di[4,4-bis(3-tert-butyl-4-hydroxyphenyl)]-pentanoae;
1,4-cyclohexyl-di[bis(3,5-di-tert-butyl-4-hydroxyphenyl)]-acetate;

etc., are described. These tetraphenolic esters, which can be prepared by condensing 2 moles of a diphenol-substituted acid chloride with 1 mole of the desired cyclic diol in the presence of air or moisture using a base as catalyst, are effective oxidation stabilizers for polymers, particularly polyolefins.

---

The present invention relates to novel phenolic compounds and, more particularly, to novel esters of phenolic substituted acids.

The esters of this invention are tetraphenolic compounds having the formula

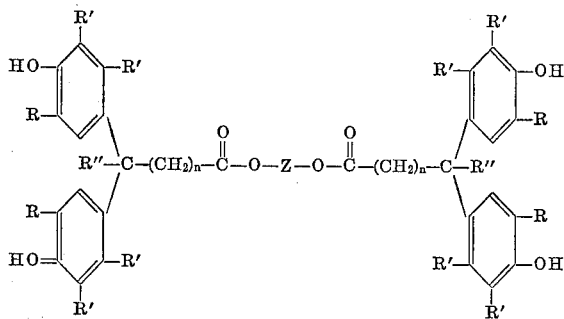

where R is an alkyl radical; R' is selected from the group consisting of hydrogen and alkyl radicals, and at least one R' on each phenolic nucleus is hydrogen; R" is selected from the group consisting of hydrogen and methyl radicals; Z is the divalent moiety of a carbocyclic diol containing from 4 to 6 carbon atoms in the ring; and $n$ is 0 to 2. Suitable alkyl groups which R and R' can comprise contain from 1 to 20 carbon atoms and, preferably, are tertiary alkyl groups containing from 4 to 9 carbon atoms. Z, as stated, is the divalent moiety of a carbocyclic diol containing from 4 to 6 carbon atoms in the ring. Typical divalent moieties containing 4 to 6 carbons in the ring are arylene and cycloalkylene radicals, such as phenylene, cyclobutylene, 2,2,4,4-tetramethyl-1,3-cyclobutylene, cyclopentylene, cyclohexylene, dimethylcyclohexylene, and the like. Typical tetraphenolic compounds of the invention include 2,2,4,4-tetramethyl-1,3-cyclobutyl-di[bis(3,5-di-tert-butyl-4-hydroxyphenyl)]-acetate,
2,2,4,4-tetramethyl-1,3-cyclobutyl-di[bis(3-tert-butyl-5-methyl-4-hydroxyphenyl)]-acetate,
2,2,4,4-tetramethyl-1,3-cyclobutyl-di[bis(3-tert-butyl-6-methyl-4-hydroxyphenyl)]-acetate,
2,2,4,4-tetramethyl-1,3-cyclobutyl-di[bis(3,5-di-tert-butyl-4-hydroxyphenyl)]-propionate,
2,2,4,4-tetramethyl-1,3-cyclobutyl-di[4,4-bis(3-tert-butyl-4-hydroxyphenyl)]-pentanoate,
1,4-cyclohexyl-di[bis(3,5-di-tert-butyl-4-hydroxyphenyl)]-acetate,
1,4-phenyl-di[bis(3,5-di-tert-butyl-4-hydroxyphenyl)]-acetate, and the like.

The tetraphenolic compounds of this invention can be prepared by condensing 2 moles of a diphenol-substituted acid chloride such as, for example, a bis(3,5-dialkyl-4-hydroxyphenyl)-acetyl chloride with 1 mole of the desired cyclic diol in the absence of air or moisture using pyridine or other base as catalyst. The acid chloride can be prepared by reacting the diphenol-substituted acid with excess thionyl chloride in anhydrous medium using, if desired, dimethylformamide to catalyze the reaction. Such diphenol-substituted acids are articles of commerce and can be prepared by reacting a phenol with a dichloro or a keto acid according to methods known to the art.

The tetraphenolic compounds of this invention are useful as oxidation stabilizers for polymeric materials and are particularly effective for stabilizing polyolefins, i.e., homopolymers, copolymers, and terpolymers of ethylene and mono-α-olefins having from 3 to 6 carbon atoms, including, for instance, polyethylene, polypropylene, poly-(butene-1), poly(pentene-1), poly(3-methylbutene-1), and poly(4-methylpentene-1), copolymers of ethylene and propylene, terpolymers of ethylene, propylene, and dicyclopentadiene, and the like. An even further increase in stability can be achieved by incorporating into the polymer, in addition to the tetraphenolic compound, a sulfur-containing compound capable of decomposing peroxides.

The following examples illustrate the preparation of the phenolic esters of the invention. All parts and percentages are by weight unless otherwise stated.

EXAMPLE 1

To a solution of 4.6 parts of bis(3,5-di-tert-butyl-4-hydroxyphenyl) ethanoic acid in 43 parts of dry toluene prepared and maintained under a nitrogen atmosphere, there was added 4.9 parts of thionyl chloride. The reaction mixture was heated to and held at 75° C. for 1 hour, after which the excess thionyl chloride was removed by distillation. The resulting solution of the acid chloride was next added dropwise, under strict exclusion of air and moisture, to a refluxing solution of 0.7 part of 2,2,4,4-tetramethyl-1,3-cyclobutanediol and 4.9 parts of pyridine in 43 parts of toluene and the mixture maintained under reflux for 3 hours, after which the refluxing was discontinued. The solvent was then evaporated off, and the resulting yellow crystalline mixture, after collection and recrystallization from boiling heptane, yielded 2.5 parts of a fine, almost white powder of 2,2,4,4-tetramethyl-1,3-cyclobutyl-di[bis(3,5 - di - tert - butyl-4-hydroxyphenyl)]-acetate melting at 257° C. Analysis of the product for $C_{63}H_{100}O_8$ gave the following results: Found, percent, C, 77.98; H, 10.1; O, 11.42. Theoretical, percent, C, 78.16; H, 9.58; O, 12.26.

EXAMPLE 2

(A) To a solution of 50 parts of bis(3,5-di-tert-butyl-4-hydroxyphenyl) ethanoic acid in 350 parts of dry benzene prepared and maintained under a nitrogen atmosphere there was first added 65.5 parts of thionyl chloride and then 8 parts of freshly distilled dimethylformamide dropwise. The reaction mixture was maintained at room temperature for 20 hours, after which time the excess thionyl chloride and the solvent were removed by distillation under reduced pressure. The residue, a yellowish-brown solid, after recrystallization from benzene hexane, gave 27.5 parts of a yellow powder of bis(3,5-di-tert-butyl-5-hydroxyphenyl) acetyl chloride melting at 147–150° C. Analysis of the product for $C_{30}H_{43}ClO_3$ gave the following results: Found, total chlorine, 7.4%; hydrolyzable chlorine, 7.1%. Theory, total chlorine, 7.3%; hydrolyzable chlorine, 7.3%.

(B) To a refluxing solution of 1.2 parts of 1,4-cyclohexanediol in 50 parts of dry benzene and 15 parts pyridine prepared and maintained under a nitrogen atmosphere there was added 10.0 parts of the above product A dissolved in 120 parts of dry benzene during a time period of 1.5 hours. After refluxing for an additional 6 hours, the reaction was stopped and the mixture allowed to stand overnight. After acidifying the reaction mixture with dilute hydrochloric acid, the mixture was washed with a saturated salt solution, and then dried over sodium sulfate. Removal of the drying agent and evaporation of the solvent gave a residue which after washing with boiling heptane was a brownish-white powder of 1,4-cyclohexyl - di[bis(3,5 - di - tert - butyl - 4 - hydroxyphenyl)]-acetate melting at 261–263° C. Analysis of the product for $C_{66}H_{96}O_8$ gave the following results: Found, percent, C, 77.5; H, 9.96; O, 12.70. Theory, percent, C, 78.0; H, 9.45; O, 12.55.

EXAMPLE 3

The procedure of Example 2(B) was repeated eexcept that 3.0 parts of the product of Example 2(A) dissolved in 50 parts of dry benzene was added dropwise over a 2-hour period to a refluxing solution of 0.34 part of hydroquinone in 50 parts of dry benzene and 5 parts of pyridine. The residue, a yellow powder, gave a yield of 1.0 part of 1,4 - phenyl - di[bis(3,5 - di - tert - butyl - 4 - hydroxyphenyl)]-acetate melting at 248–252° C. Analysis of the product for $C_{66}H_{90}O_8$ gave the following results: Found, percent, C, 78.1; H, 9.23. Theory, percent, C, 78.4; H, 8.91.

EXAMPLE 4

To a solution of 24.84 parts of bis(3-tert-butyl-6-methyl-4-hydroxyphenyl) ethanoic acid in 130 parts of dry benzene there was added 28.65 parts of thionyl chloride. The reaction mixture was refluxed for 6 hours while a slow nitrogen stream was bubbled into the reaction mixture, after which the reaction was stopped and the excess thionyl chloride and one-half of the solvent were removed by distillation. The resulting benzene solution of the acid chloride was next added dropwise, under a nitrogen atmosphere, to a refluxing solution of 4.66 parts of 2,2,4,4-tetramethyl-1,3-cyclobutanediol and 52 parts of pyridine in 250 parts dry benzene. After refluxing for an additional 6 hours, the reaction was stopped, allowed to stand overnight, and then was acidified with dilute hydrochloric acid to give a 3-phase system (water, benzene, and solid). The solid phase was filtered from the benzene and water phases and the solid phase washed with boiling heptane and then dried. The product comprised 16 parts of a yellow powder of 2,2,4,4-tetramethyl-1,3-cyclobutyl - di[bis(3 - tert - butyl - 6 - methyl - 4 - hydroxyphenyl)]-acetate melting at 196–200° C. (decomposed during melting).

EXAMPLE 5

The procedure of Example 4 was repeated except that 25.8 parts of 4,4-bis(3-tert-butyl-4-hydroxyphenyl)-pentanoic acid was used instead of 24.84 parts of bis(3-tert-butyl-6-methyl-4-hydroxyphenyl)-ethanoic acid, and the solid product obtained was 2,2,4,4-tetramethyl-1,3-cyclobutyl - di[4,4 - bis(3-tert-butyl-4-hydroxyphenyl)]pentanoate.

EXAMPLE 6

The 2,2,4,4 - tetramethyl - 1,3 - cyclobutyl - di[bis(3,5-di-tert-butyl-4-hydroxyphenyl)]-acetate of Example 1 was evaluated as an antioxidant by blending 0.5 part of it with 100 parts of stereoregular polypropylene having a birefringent melting point of about 168° C., an RSV of 3.6 (specific viscosity divided by concentration of a 0.1% weight/volume solution of polymer in decahydronaphthalene at 135° C.) and containing 0.1% by weight of the polymer of calcium stearate as an antacid. The composition was compression molded into 10-mil sheets at a pressure of 1500 p.s.i. using a cycle of 215° C./5 minutes and then cooled under pressure. The sheets were cut into 3½ x ¾-inch strips and evaluated for embrittlement by exposing in a 140° C. circulating air oven until the first sign of degradation was observed. The composition of this example gave an embrittlement time of 122 days whereas a control containing no tetraphenolic ester gave an embrittlement time of 1–3 days.

What I claim and desire to protect by Letters Patent is:
1. A tetraphenolic compound of the formula

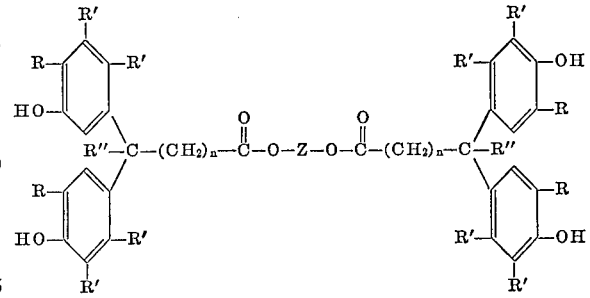

where R is an alkyl radical containing from 1 to 20 carbon atoms, R' is selected from the group consisting of hydrogen and alkyl radicals containing from 1 to 20 carbon atoms, and at least one R' on each phenolic nucleus is hydrogen, R" is selected from the group consisting of hydrogen and methyl radicals, Z is a divalent moiety of a carbocyclic diol containing from 4 to 6 carbon atoms in the ring, said ring being that of an arylene or cycloalkylene radical, and $n$ is a number from 0 to 2.

2. The tetraphenolic compound of claim 1 wherein Z is a moiety selected from the group consisting of 2,2,4,4-tetramethyl-1,3-cyclobutylene, 1,4-cyclohexylene, and phenylene.

3. The tetraphenolic compound 2,2,4,4-tetramethyl-1,3-cyclobutyl - di[bis(3,5 - di - tert - butyl - 4 - hydroxyphenyl)]-acetate.

4. The tetraphenolic compound 2,2,4,4-tetramethyl-1,3-cyclobutyl - di[bis(3 - tert - butyl - 6 - methyl - 4 - hydroxyphenyl]-acetate.

5. The tetraphenolic compound 1,4-cyclohexyl-di[bis(3,5-tert-butyl-4-hydroxyphenyl)]-acetate.

6. The tetraphenolic compound 1,4-phenyl-di[bis(3,5-di-tert-butyl-4-hydroxyphenyl)]-acetate.

7. The tetraphenolic compound 2,2,4,4-tetramethyl-1,3-cyclobutyl - di[4,4 - bis(3 - tert - butyl - 4 - hydroxyphenyl)]-pentanoate.

References Cited

UNITED STATES PATENTS 3,247,240  4/1966  Meier et al. _____ 260—473
3,112,338  11/1963  Smutny et al. _____ 260—473

LORRAINE A. WEINBERGER, *Primary Examiner.*

J. H. NIELSEN, *Assistant Examiner.*

PO-1050
(5/69)

UNITED STATES PATENT OFFICE
CERTIFICATE OF CORRECTION

Patent No. 3,450,746                  Dated  June 17, 1969

Inventor(s)         Christian H. Stapfer

It is certified that error appears in the above-identified patent and that said Letters Patent are hereby corrected as shown below:

Column 1, in the formula, that portion of the formula reading  should read 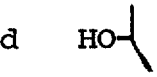

In the Claims, Claim 1, that portion of the formula in the upper left-hand benzene ring (Ring on the left, Column 4, lines 24-29) reading 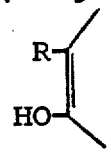

should read 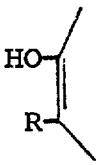

In the Claims, Claim 4, line 56, " droxyphenyl/-acetate" should read -- droxyphenyl]/-acetate --.

SIGNED AND
SEALED

SEP 30 1969

(SEAL)
Attest:

Edward M. Fletcher, Jr.
Attesting Officer

WILLIAM E. SCHUYLER, JR.
Commissioner of Patents